United States Patent
Langendijk et al.

(10) Patent No.: US 10,108,004 B1
(45) Date of Patent: Oct. 23, 2018

(54) ELECTROWETTING DISPLAY PIXELS WITH QUANTUM DOTS

(71) Applicant: Amazon Technologies, Inc., Seattle, WA (US)

(72) Inventors: Erno Hermanus Antonius Langendijk, Eindhoven (NL); Lara Tauk, Eindhoven (NL); Robin Leguijt, Eindhoven (NL); Irén Fischer, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/981,615

(22) Filed: Dec. 28, 2015

(51) Int. Cl.
*G02B 26/00* (2006.01)
*B82Y 20/00* (2011.01)

(52) U.S. Cl.
CPC ............ *G02B 26/005* (2013.01); *B82Y 20/00* (2013.01); *Y10S 977/774* (2013.01)

(58) Field of Classification Search
CPC .................................................... G02B 26/005
USPC ........................................................ 359/290
See application file for complete search history.

(56) References Cited

U.S. PATENT DOCUMENTS

2011/0261303 A1* 10/2011 Jang ..................... G02F 1/13318
349/108
2012/0320445 A1* 12/2012 Yang .................... G02B 26/005
359/290

FOREIGN PATENT DOCUMENTS

WO          03071346 A1    8/2003
WO       2008142085 A1   11/2008

* cited by examiner

*Primary Examiner* — James Jones
(74) *Attorney, Agent, or Firm* — EIP US LLP

(57) ABSTRACT

An electrowetting display comprises a support plate on which individual electrowetting pixels separated from one another by pixel walls are formed. The individual electrowetting pixels include an electrode layer on the support plate, a dielectric barrier layer on the electrode layer, a hydrophobic layer on the dielectric barrier layer, and quantum dots between the hydrophobic layer and the electrode layer. The quantum dots may utilize blue or white light illuminating the pixels to emit longer-wavelength colors such as red and green. Such a feature may enhance or replace functionality of color filters.

19 Claims, 10 Drawing Sheets

ELECTROWETTING DISPLAY PIXELS WITH QUANTUM DOTS

BACKGROUND

Electronic displays are found in numerous types of electronic devices such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth. Electronic displays may present various types of information, such as user interfaces, device operational status, digital content items, and the like, depending on the kind and purpose of the associated device. The appearance and quality of a display may affect a user's experience with the electronic device and the content presented thereon. Accordingly, finding ways to enhance user experience and satisfaction continues to be a priority. Moreover, increased multimedia use imposes high demands on designs, packaging, and fabricating display devices, as content available for mobile use becomes more extensive and device portability continues to be a high priority.

An electrowetting display includes an array of pixels individually bordered by pixel walls that retain liquid, such as opaque oil, for example. Light transmission through each pixel is adjustable by electronically controlling a position of the liquid in the pixel. Resolution and quality of an electrowetting display may depend on a number of factors, such as optical transmissivity or reflectivity of material layers of the electrowetting display and pixel size, just to name a few examples.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
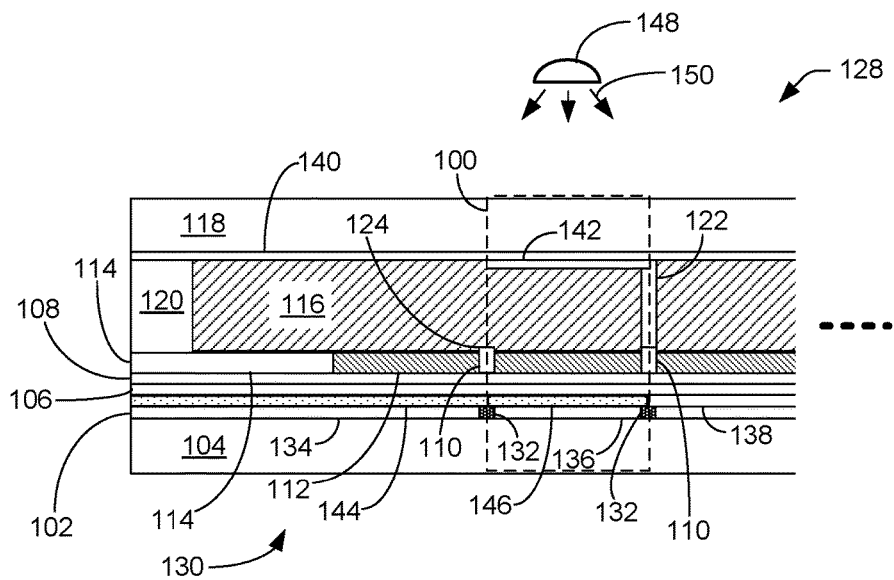
FIG. 1 illustrates a cross-section of a portion of an electrowetting display device, according to some embodiments.

In various embodiments described herein, electronic devices include electrowetting displays for presenting content and other information. In some examples, the electronic devices may include one or more components associated with the electrowetting display, such as a touch sensor component layered atop the electrowetting display for detecting touch inputs, a front light or back light component for lighting the electrowetting display, and/or a cover layer component, which may include antiglare properties, antireflective properties, anti-fingerprint properties, anti-cracking properties, and the like. Various embodiments described herein include techniques for assembling electronic devices including these components for the electrowetting displays and other features described herein.

In some embodiments, an electrowetting display may include individual pixels incorporating quantum dots. Generally, quantum dots may be considered to be nano-particles having extremely small sizes. Quantum dots may emit light of one color as a result of receiving light of another color, similar to the function of a color filter (though portions of the physical process are generally different), for example. The color resulting from action by a quantum dot depends, at least in part, on the size of the quantum dot. Generally, relatively large quantum dots utilize incoming light to emit colors in the red end of the visible spectrum as compared to relatively small quantum dots that utilize incoming light to emit colors in the green or blue end of the visible spectrum.

Quantum dots adapted to produce particularly colored light may be located in particular pixels of an electrowetting display for producing the particular color. Hereinafter, the action of a quantum dot receiving light of a first color and resultantly emitting light of a second color may be considered as a conversion from the first color (of light) to the second color (of light). Thus, the different pixels may correspond to differently colored pixels configured for a colored display. In some implementations, quantum dots may be included in pixels to enhance or replace color filters. For example, a layer or other distribution of quantum dots may be located on top of a color filter so that ambient light or light from a light source may impinge on the quantum dots before entering the color filter. In an example of an electrowetting pixel without a color filter, a layer or other distribution of quantum dots may be located on a top plate so that the quantum dots are proximal to a glass substrate, which may comprise the top plate. In either case, an electrowetting display that incorporates quantum dots may be more efficient and provide improved color saturation as compared to an electrowetting display that does not include quantum dots. One reason for the greater efficiency is that color filters transmit a relatively small (e.g., about 60 to 70%) portion of received light, while the remaining portion is absorbed and/or reflected. Quantum dots are relatively highly efficient at utilizing light of one color to emit light of another color. Thus, an electrowetting display that incorporates quantum dots in place of color filters may have a relatively high efficiency.

Incorporating quantum dots in an electrowetting display may also provide an opportunity to adjust or customize colors and optical throughput of the pixels of the electrowetting display. For example, the concentration and/or size of quantum dots (and/or addition of color filters) may be adjusted for any of the color pixels to tune or select the color saturation of the color pixels.

Another reason for the greater efficiency of an electrowetting display that incorporates quantum dots as compared to an electrowetting display that does not include quantum dots is that a dielectric material that includes quantum dots may have a greater dielectric constant as compared to the same material sans quantum dots. Thus, in some configurations, quantum dots in a material may increase a dielectric constant of the material and enhance an electric field through the material. In such a case, driving voltages of the electrowetting display may be reduced as compared to the case of an electrowetting display without quantum dots.

A display device, such as an electrowetting display device that incorporates quantum dots, may be a transmissive, reflective or transflective display that generally includes an array of pixels (e.g., which may comprise subpixels) configured to be operated by an active matrix addressing scheme. For example, rows and columns of electrowetting pixels are operated by controlling voltage levels on a plurality of source lines and gate lines. In this fashion, the display device may produce an image by selecting particular pixels to transmit, reflect or block light. Pixels are addressed (e.g., selected) via rows and columns of the source lines and gate lines that are electrically connected to transistors (e.g., used as switches) included in each pixel. Transistors take up a relatively small fraction of the area of each pixel to allow light to efficiently pass through (or reflect from) the display pixel. Herein, a pixel may, unless otherwise specified, comprise a pixel that includes two or more subpixels of an electrowetting display device. Such a subpixel may be the smallest light transmissive, reflective or transflective pixel of a display that is individually operable to directly control an amount of light transmission through or reflection from the pixel. For example, in some implementations, a pixel may comprise a red subpixel, a green subpixel, a blue subpixel, and a white subpixel (among other possible colors). In other implementations, a pixel may be a smallest component, e.g., the pixel does not include any subpixels.

Electrowetting displays include an array of pixels sandwiched between two support plates, such as a bottom support plate and a top support plate. For example, a bottom support plate in cooperation with a top support plate may contain pixels that include electrowetting oil, electrolyte solution and pixel walls between the support plates. Support plates may include glass, plastic (e.g., a transparent thermoplastic such as PMMA or other acrylic), or other transparent material and may be made of a rigid or flexible material, for example. Pixels include various layers of materials built upon a bottom support plate. One such layer is a hydrophobic fluoropolymer (AF) upon which pixel walls are built.

Hereinafter, example embodiments include, but are not limited to, reflective electrowetting displays that include a clear top support plate and a bottom support plate, which need not be transparent. The clear top support plate may comprise glass or any of a number of transparent materials, such as plastic, quartz, semiconductors, and so on, and claimed subject matter is not limited in this respect. "Top" and "bottom", as used herein to identify the support plates of an electrowetting display, do not necessarily refer to a direction referenced to gravity or to a viewing side of the electrowetting display. Also, as used herein for sake of convenience of describing example embodiments, the top support plate is that through which viewing of pixels of a (reflective) electrowetting display occurs.

In some embodiments, a reflective electrowetting display comprises an array of pixels sandwiched between a bottom support plate and a top support plate. The bottom support plate may be opaque while the top support plate is transparent. Herein, describing a pixel or material as being "transparent" means that the pixel or material may transmit a relatively large fraction of the light incident upon it. For example, a transparent material or layer may transmit more than 70% or 80% of the light impinging on its surface, though claimed subject matter is not limited in this respect.

Pixel walls retain at least a first fluid which is electrically non-conductive, such as opaque or colored oil, in the individual pixels. A cavity formed between the support plates is filled with the first fluid (e.g., retained by pixel walls) and a second fluid (e.g., considered to be an electrolyte solution) that is electrically conductive or polar and may be a water or a salt solution such as a solution of potassium chloride water. The second fluid may be transparent, but may be colored, or light-absorbing. The second fluid is immiscible with the first fluid.

Individual reflective electrowetting pixels may include a reflective layer on the bottom support plate of the electrowetting pixel, a transparent electrode layer adjacent to the reflective layer, and a hydrophobic layer on the electrode layer. Pixel walls of each pixel, the hydrophobic layer, and the transparent top support plate at least partially enclose a liquid region that includes an electrolyte solution and an opaque liquid, which is immiscible with the electrolyte solution. An "opaque" liquid, as described herein, is used to describe a liquid that appears black to an observer. For example, an opaque liquid strongly absorbs a broad spectrum of wavelengths (e.g., including those of red, green and blue) in the visible region of electromagnetic (EM) radiation. In some implementations, the opaque liquid is a nonpolar electrowetting oil.

The opaque liquid is disposed in the liquid region. As described in detail below, coverage area of the opaque liquid on the bottom hydrophobic layer is electronically adjustable to affect the amount of light incident on the reflective electrowetting display that reaches the reflective material at the bottom of each pixel.

In addition to pixels, spacers and edge seals may also be located between two support plates. Support plates may comprise any of a number of materials, such as plastic, glass, quartz, semiconductors, and so on, and claimed subject matter is not limited in this respect.

Spacers and edge seals which mechanically connect a first support plate with a second overlying support plate, or which form a separation between the first support plate and the second support plate, contribute to mechanical integrity of the electrowetting display. Edge seals, for example, being disposed along a periphery of an array of electrowetting pixels, may contribute to retaining (e.g., first and second) fluids between the first support plate and the second overlying support plate. Spacers are desirably transparent so as to not hinder throughput of light in the electrowetting display. Transparency of spacers may at least partially depend on the refractive index of the spacer material, which should be similar to or the same as the refractive indices of surrounding media. Spacers are also desirably chemically inert to surrounding media.

In some embodiments, a display device as described herein may comprise a portion of a system that includes one or more processors and one or more computer memories, which may reside on a control board, for example. Display software may be stored on the one or more memories and may be operable with the one or more processors to modulate light that is received from an outside source (e.g., ambient room light) or out-coupled from a light guide of the display device. For example, display software may include code executable by a processor to modulate optical properties of individual pixels of the electrowetting display based, at least in part, on electronic signals representative of image or video data. The code may cause the processor to modulate the optical properties of pixels by controlling electrical signals (e.g., voltages, currents, fields, and so on) on, over, or in layers of the electrowetting display.

FIG. 1 is a cross-section of a portion of a reflective electrowetting display device illustrating several electrowetting pixels 100, according to some embodiments. Though three such electrowetting pixels are illustrated, an electrowetting display device may include any number (usually a very large number, such as thousands or millions) of electrowetting pixels. An electrode layer 102 is formed on a first (e.g., bottom) support plate 104 and may comprise one or more individual electrodes in each electrowetting pixel.

In various embodiments, electrode layer 102 may be connected to any number of thin film transistors (TFTs) (not illustrated) that are switched to either select or deselect electrowetting pixels 100 using active matrix addressing, for example. A TFT is a particular type of field-effect transistor that includes thin films of an active semiconductor layer as well as a dielectric layer and metallic contacts over or on a supporting (but non-conducting) substrate, which may be glass or any of a number of other transparent or non-transparent materials, for example.

In some implementations, a barrier layer 106 may at least partially separate electrode layer 102 from a hydrophobic layer 108 also formed on first support plate 104. In some implementations, hydrophobic layer 108 may comprise any of a number of types of fluoropolymers, such as AF1600®, produced by DuPont, based in Wilmington, Del. Hydrophobic layer 108 may also be any of a number of water-repelling materials that affect wettability of an adjacent material, for example.

Pixel walls 110 form a patterned electrowetting pixel grid on hydrophobic layer 108. Pixel walls 110 may comprise a photoresist material such as, for example, epoxy-based negative photoresist SU-8. The patterned electrowetting pixel grid comprises rows and columns that form an array of electrowetting pixels. For example, an electrowetting pixel may have a width and length in a range of about 50 to 500 microns. In some implementations, the pixel walls need not be on the hydrophobic layer. For example, pixel walls may be directly on an underlying dielectric layer (not illustrated in FIG. 1).

A first fluid 112, which may have a thickness (e.g., depth, height) in a range of about 1 to 10 microns, for example, overlies hydrophobic layer 108. First fluid 112 is partitioned by pixel walls 110 of the patterned electrowetting pixel grid. An outer rim 114 may comprise the same material as pixel walls 110. A second fluid 116, such as an electrolyte solution, overlies first fluid 112 and pixel walls 110 of the patterned electrowetting pixel grid. First fluid 112 is at least partially immiscible with second fluid 116 so that the first fluid and the second fluid do not substantially mix with each other, and in some examples do not mix with each other to any degree. Herein, substances are immiscible with one another if the substances do not substantially form a solution. Second fluid 116 is preferably transparent, but may be colored or absorbing. First fluid 112 is non-polar and may for instance be an alkane like hexadecane or (silicone) oil.

A second (e.g., top) support plate 118 covers second fluid 116 and edge seals 120 maintain second fluid 116 over the electrowetting pixel array. Support plate 118 may be supported by edge seals 120 and a spacer grid 122, a portion of which is illustrated in FIG. 1. Spacer grid array 122 may substantially extend over the array of pixels 100. For example, portions of spacer grid 122 may extend from tops 124 of pixel walls 110 to second support plate 118.

The reflective electrowetting display device has a viewing side 128 on which an image formed by the electrowetting display device may be viewed, and a rear side 130. Second support plate 118 faces viewing side 128 and first support plate 104 faces rear side 130. The electrowetting display device may be an active matrix driven display type or a passive matrix driven display, just to name a few examples.

Separation block 132 represents a discontinuity of electrical conductivity along electrode layer 102. For example, a first portion 134 of electrode layer 102 may be electrically insulated or separated from a second portion 136 and a third portion 138 of electrode layer 102 so that each portion 134, 136, and 138 is connected to a respective pixel region. Electrode layer 102 need not extend to edges of the display area of the electrowetting display device, as illustrated in the figure.

In some embodiments, electrowetting pixels may include a second electrode 140 disposed on second support plate 118, one or more color filters 142, or a black matrix (not illustrated). Though a single color filter is illustrated in FIG. 1, an electrowetting pixel need not include a color filter in some or all pixels. The electrode on the second support plate may or may not be patterned to form any of a number of circuit configurations, for example.

A distribution of quantum dots 144 and 146 may be respectively located in different pixels. Such a distribution may be present in a pixel as a homogeneous or non-homogenous concentration of quantum dots in a dedicated matrix material layer or in any of the barrier layer 106, the electrode layer 102 and/or the hydrophobic layer 108. Some pixels need not include any quantum dots. Quantum dots 144 may have a different size, and thus a different "color", as compared to quantum dots 146, as described below.

Hydrophobic layer 108 is arranged on first support plate 104 to create an electrowetting surface area. The hydrophobic character causes first fluid 112 to adjoin preferentially to first support plate 104 since first fluid 112 has a higher wettability with respect to the surface of hydrophobic layer 108 than second fluid 116. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability for a contact angle of more than 90° to complete wettability for a contact angle of 0°, in which case the fluid tends to form a film on the surface of the solid.

First fluid 112 absorbs at least a part of the optical spectrum. First fluid 112 may be transmissive for a part of the optical spectrum, and in some implementations may form a color filter. For this purpose, the fluid may be colored by addition of pigment particles or dye, for example. Alternatively, first fluid 112 may be colored or black (e.g., absorbing substantially all parts of the optical spectrum) or reflecting. Hydrophobic layer 108 may be transparent or colored. A reflective layer may reflect the entire visible spectrum, making the layer appear white, or part of it, making it have a color.

In some embodiments, a light source 148 may be located external to the electrowetting pixels and may incorporate a light guide and/or diffuser, for example. Light source 148 may generate white light or blue light. That is, light source 148 may generate light substantially across the visible spectrum (e.g., from about 400 nanometers to about 700 nanometers) or may generate light having a spectrum concentrated in the blue part of the visible spectrum (e.g., about 400 nanometers to about 450 nanometers). Arrows 150 in FIG. 1 represent light guiding and/or diffusing functions.

If a voltage is applied across electrowetting pixel 100 (e.g., between electrode layer 102 and second electrode 140), electrowetting pixel 100 will enter into an active state. Electrostatic forces will move second fluid 116 toward electrode layer 102, thereby displacing first fluid 112 from the area of hydrophobic layer 108 to pixel walls 110 surrounding the area of hydrophobic layer 108, to a droplet-like shape. Such displacing action at least partly uncovers first fluid 112 from the surface of hydrophobic layer 108 of electrowetting pixel 100.

If the voltage across electrowetting pixel 100 is returned to an inactive signal level of zero or a value near to zero, electrowetting pixel 100 will return to an inactive state, where first fluid 112 flows back to cover hydrophobic layer 108. In this way, first fluid 112 forms an electrically controllable optical switch in each electrowetting pixel 100. Of course, such details of an electrowetting display device are merely examples, and claimed subject matter is not limited in this respect.

Figure 2:
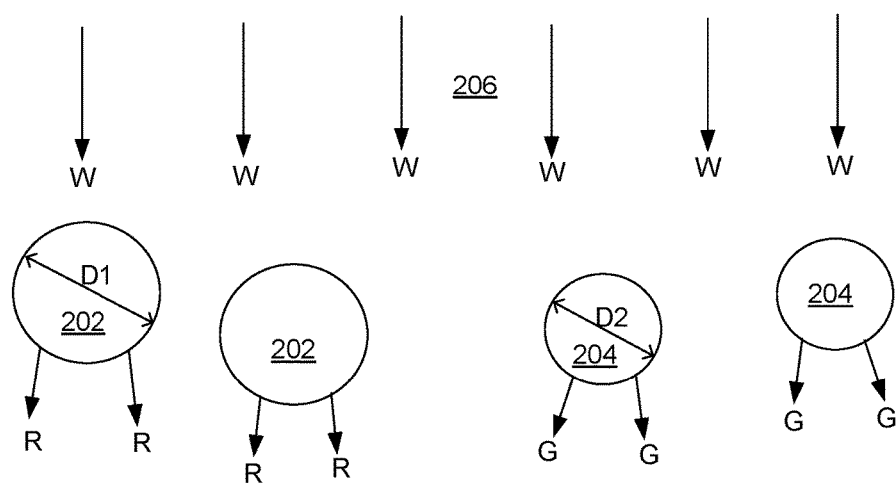
FIG. 2 is a schematic diagram of quantum dots illuminated by white light, according to various embodiments.

FIG. 2 is a schematic diagram of quantum dots 202, 204 illuminated by white light 206, according to various embodiments. Here, quantum dots 202, 204 are schematically illustrated as being spherical, but quantum dots may be any shape or size. White light 206 may comprise EM energy that includes a spectral range from about 400 nm to about 700 nm. In some embodiments, light impinging on quantum dots 202, 204 may be "blue light", comprising EM energy substantially in a spectral range from about 400 nm to about 450 nm. Generally, quantum dots utilize light having a first wavelength(s) to emit a fluorescence spectrum of light having second wavelength(s) longer than the first wavelengths. In particular, subsequent to light impinging on a quantum dot, photon transitions between band gaps may resultantly occur due to the impinging light energizing the quantum dot. Light of a particular color may be emitted as a response. Generally, the smaller the size of a quantum dot, the shorter the second wavelength(s). Quantum dot size may affect energy differences between band gaps, so that color of emitted light may be consequently affected by size of the quantum dot. For example, quantum dots 202, having a diameter D1, may utilize white light 206 (or blue light) to emit red light. Quantum dots 204, having a diameter D2 that is smaller than D1, may utilize white light 206 (or blue light) to emit green light.

Thus, for example, an electrowetting display may comprise red pixels that include a distribution of quantum dots 202 that emit a spectrum corresponding to red. Green pixels may include a distribution of quantum dots 204 that emit a spectrum corresponding to green.

Quantum dots, also known as nanocrystals, may comprise semiconductor elements such as, for example, CdS, CdSe, CdTe, ZnS, ZnSe, ZnTe, GaAs, GaP, GaAs, GaSb, HgS, HgSe, HgTe, InAs, InP, InSb, AlAs, AlP, AlSb. Quantum dots may range in size from about 2 nanometers (nm) to about 10 nm in diameter. At these scales, quantum dots may have size-tunable band gaps so that spectral emission (e.g., color spectrum) depends, at least in part, upon size. Quantum dots may have relatively high photoluminescence quantum efficiencies, good thermal and photo-stability, and narrow emission line widths (atom-like spectral emission), for example. Quantum dots may be manufactured by using colloidal solution chemistry.

Quantum dots may be synthesized with a wider band gap outer shell, comprising for example ZnO, ZnS, ZnSe, ZnTe, CdO, CdS, CdSe, CdTe, MgS, MgSe, GaAs, GaN, GaP, GaAs, GaSb, HgO, HgS, HgSe, HgTe, InAs, InN, InP, InSb, AlAs, AN, AlP, AlSb. The shell surrounds the core quantum dots and may result in a significant increase in quantum yield. Capping quantum dots with a shell tends to reduce non-radiative recombination and may result in brighter emission.

Due to their small size, typically on the order of 10 nm or smaller, quantum dots have larger band gaps relative to the corresponding bulk material. Generally, the smaller the quantum dots, the higher the band gap. Therefore, when illuminated by a photon (emissive electron-hole pair recombination), the smaller the diameter of the quantum dots, the shorter the wavelength of light will be released. Discontinuities and crystal defects on the surface of a quantum dot may result in non-radiative recombination of electron-hole pairs that lead to reduced or completely quenched emission of the quantum dot.

A light source (e.g., a blue or an ultra violet (UV) source) may be used to provide photons to (e.g., to illuminate) quantum dots so the quantum dots emit photons in a frequency range corresponding to a specific color as determined by the size-tunable band gap of the quantum dots. Depending on a desired color of pixel, quantum dots located in the pixel may have a size corresponding to the color.

Figure 3:
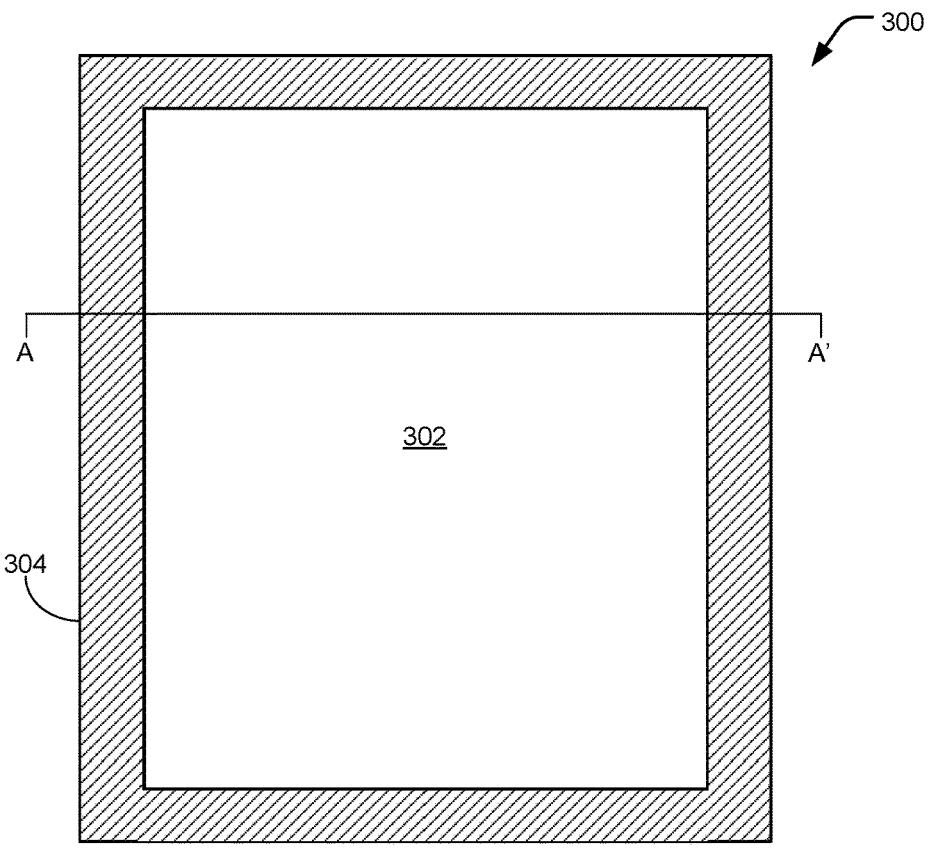
FIG. 3 illustrates a top view of an electrowetting pixel, according to some embodiments.

FIG. 3 illustrates a top view of a lower portion of an electrowetting pixel 300 in an inactive state if the pixel is substantially covered with an electrowetting fluid 302, according to some embodiments. This top view, for example, is looking down onto structure that may be formed on a lower support plate. For example, electrowetting fluid 302 may comprise an opaque oil. Pixel 300 includes pixel walls 304 surrounding a pixel region 306. Pixel walls 304 present a peripheral boundary to electrowetting fluid 302. Though not shown in FIG. 3, electrowetting pixel 300 includes another electrowetting fluid overlying electrowetting fluid 302 and pixel walls 304. For example, while electrowetting fluid 302 may comprise an oil, the overlying electrowetting fluid may comprise an electrolyte solution.

Figure 4:
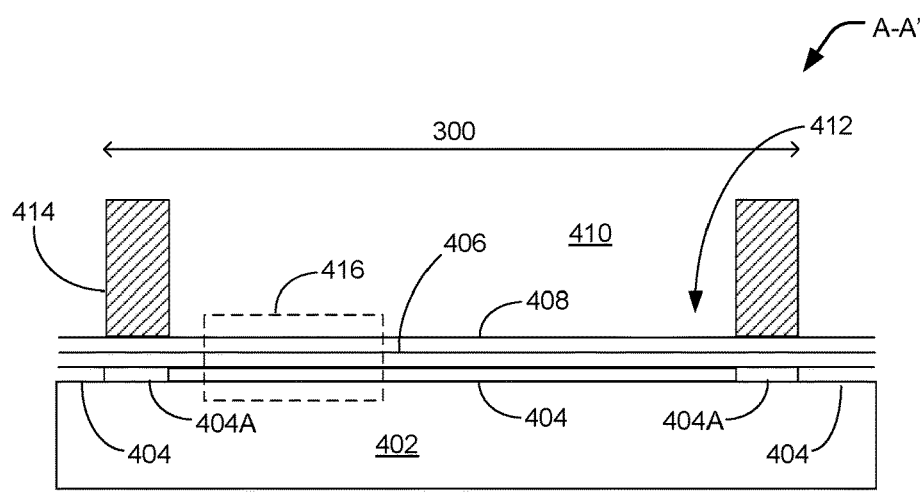
FIG. 4 illustrates a cross-section view of an electrowetting pixel, according to some embodiments.

FIG. 4 is a cross-section view of electrowetting pixel 300 along line A-A', according to some embodiments. Pixel 300 may be located on a support plate 402, may be substantially flat, and may include, among other things, a conductive layer 404, a dielectric barrier layer 406, and a hydrophobic layer 408 at least partially covering the dielectric barrier layer. The conductive layer, dielectric barrier layer, and the hydrophobic layer may be formed or otherwise disposed on support plate 402. Conductive layer 404 may be an electrode layer disposed on support plate 402.

For a particular example, dielectric barrier layer 406 may comprise SiN and may have a thickness in a range from about 100 nanometers up to about 400 nanometers. Thickness of conductive layer 404 may be in a range from about 200 nanometers up to about 300 nanometers. In substantially the same plane as conductive layer 602, an insulative material or dielectric material 404A may be located between adjacent portions of conductive layer 404. A fluid region 410, which may comprise one or more different fluids that are immiscible with one another, may cover the stack of conductor(s) and dielectric(s) 404-406 and hydrophobic layer 408. The surface, at which arrow 412 points, of hydrophobic layer 408 is configured to receive light that may impinge on electrowetting pixel 300. Dielectric barrier layer 406 and hydrophobic layer 408 are substantially transparent. In some examples, conductive layer 404 may be transmissive, such as in the case for a transmissive electrowetting display. In other examples, conductive layer 404 (e.g., an electrode) may be reflective, such as in the case for a reflective electrowetting display. Pixel walls 414 may surround a periphery of fluid region 410.

Pixel 300 may include quantum dots (not illustrated in FIG. 4) in any of a number of locations between (and possibly including) electrode layer 404 and hydrophobic layer 408. In some examples, Pixel 300 may include quantum dots (not illustrated in FIG. 4) in or on any portion of a second support plate (e.g., 118 of FIG. 1) that overlays fluid region 410. A color filter may also be present with such quantum dots on the second support plate. A region 416, indicated in FIG. 4 by a dashed rectangle, of pixel 300 is illustrated and described in detail below. In some embodiments, pixel 300 may include a color filter (not illustrated). Though claimed subject matter is not so limited, any of the embodiments described in FIGS. 5-8 may or may not include a color filter in some portion of a path of light (e.g., white or blue light) that illuminates pixel 300. The presence of a color filter(s) may be used to adjust or to enhance operating colors of the pixel in coordination with the spectrum of the illumination source, for example.

Figure 5:
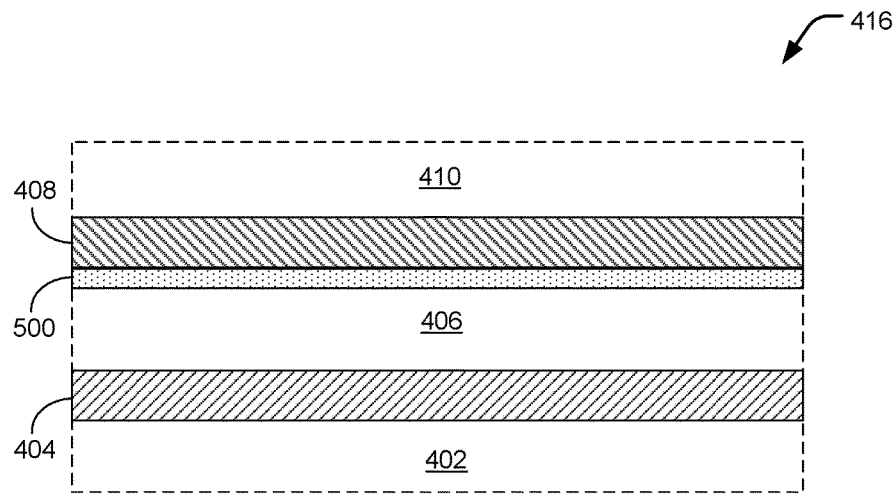
FIG. 5 illustrates a cross-section view of an electrowetting pixel including a portion with quantum dots above a barrier layer, according to some embodiments.

FIG. 5 illustrates a cross-section view of region 416 of pixel 300, according to some embodiments. Conductive layer 404 on support plate 402 is at least partially covered by dielectric barrier layer 406. A distribution of quantum dots 500 may be located so as to include an interface between the dielectric barrier layer and the overlaying hydrophobic layer 408. Fluid region 410 may cover hydrophobic layer 408. In some implementations, quantum dots 500 may be homogeneously or inhomogeneously disposed (e.g., such as a colloidal dispersion) in a material matrix, such as a photoresist material, a polymer, or polymer hybrid/blend, for example. The material matrix may form a layer between dielectric barrier layer 406 and hydrophobic layer 408. In other implementations, quantum dots 500 may be homogeneously or inhomogeneously distributed in a portion (e.g., a lower portion relatively close to support plate 402) of hydrophobic layer 408. Quantum dots 500 may be distributed with any concentration, but in some examples the quantum dot concentration may be up to about 50% volume. In still other implementations, quantum dots 500 may be homogeneously or inhomogeneously (e.g., non-constant concentration in a volume) distributed in a portion (e.g., an upper portion relatively far from support plate 402) of dielectric barrier layer 406. Such distribution may be up to about 50% volume, for example.

Figure 6:
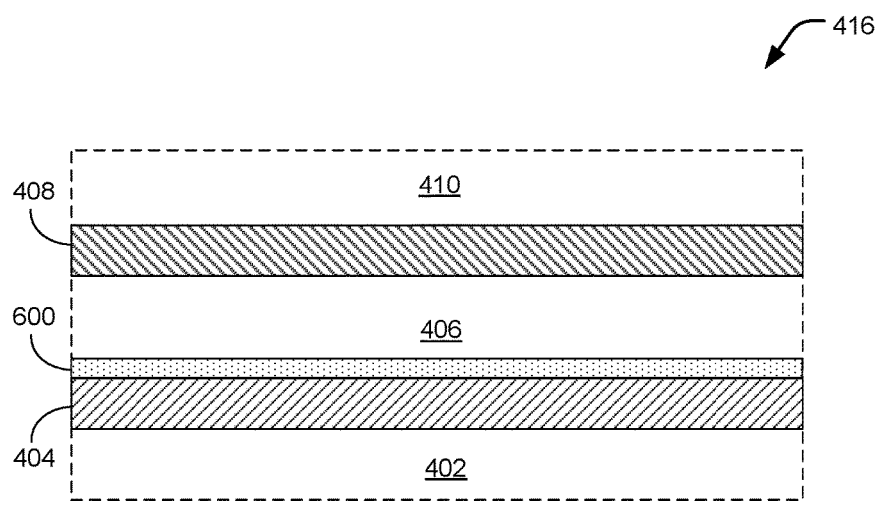
FIG. 6 illustrates a cross-section view of an electrowetting pixel including a portion with quantum dots below a barrier layer, according to some embodiments.

FIG. 6 illustrates a cross-section view of region 416 of pixel 300, according to some embodiments. Conductive layer 404 on support plate 402 is at least partially covered by dielectric barrier layer 406. A distribution of quantum dots 600 may be located so as to include an interface between the conductive layer 404 and the overlaying dielectric barrier layer 406. In some implementations, quantum dots 600 may be homogeneously or inhomogeneously disposed (e.g., such as a colloidal dispersion) in a material matrix that may form a layer between conductive layer 404 and dielectric barrier layer 406. Such distribution may be up to about 50% volume, for example. In other implementations, quantum dots 600 may be homogeneously or inhomogeneously distributed in a portion (e.g., a lower portion relatively close to support plate 402) of dielectric barrier layer 406. Such distribution may be up to about 50% volume, for example. In still other implementations, quantum dots 600 may be homogeneously or inhomogeneously distributed (e.g., up to about 50% volume) in a portion (e.g., an upper portion relatively far from support plate 402) of conductive layer 402.

Figure 7:
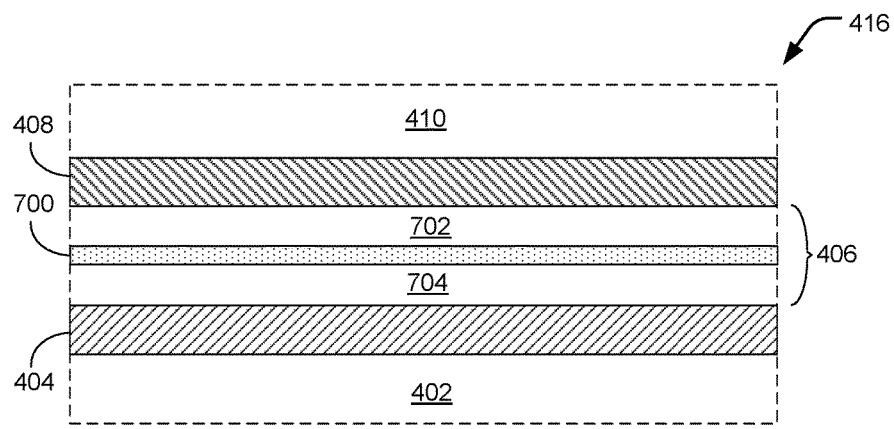
FIG. 7 illustrates a cross-section view of an electrowetting pixel including a portion with quantum dots in a barrier layer, according to some embodiments.

FIG. 7 illustrates a cross-section view of region 416 of pixel 300, according to some embodiments. Conductive layer 404 on support plate 402 is at least partially covered by dielectric barrier layer 406. A distribution of quantum dots 700 may be located so as to be homogeneously or inhomogeneously distributed (e.g., up to about 50% volume) in a middle region between an upper portion 702 of dielectric barrier layer 406 and a lower portion 704 of dielectric barrier layer 406. In some implementations, upper portion 702 and lower portion 704 of dielectric barrier layer 406 may comprise the same or similar dielectric material. In other implementations, upper portion 702 and lower portion 704 of dielectric barrier layer 406 may comprise different dielectric materials.

Figure 8:
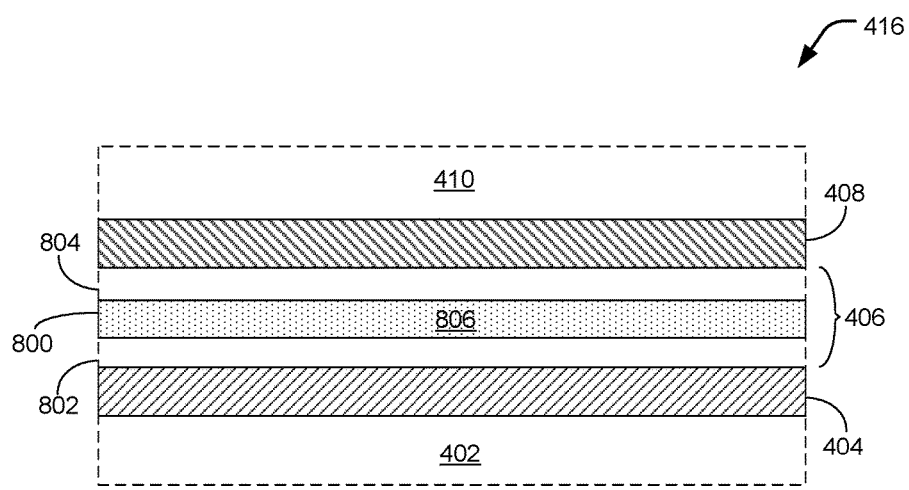
FIG. 8 illustrates a cross-section view of an electrowetting pixel including a portion with quantum dots distributed in a barrier layer, according to some embodiments.

FIG. 8 illustrates a cross-section view of region 416 of pixel 300 that includes quantum dots 800, according to some embodiments. Conductive layer 404 on support plate 402 is at least partially covered by dielectric barrier layer 406. In some implementations, dielectric barrier layer 406 may be a multilayer structure, including sublayers comprising organic and inorganic dielectric material, for example. Thus, as illustrated in FIG. 8, dielectric barrier layer 406 includes a lower sublayer 802 and an upper sublayer 804.

An inorganic layer may comprise silicon oxide, silicon nitride or alumina, just to name a few examples. An organic layer may comprise polyamide, for example. An organic layer may have an insulating property higher than that of an inorganic layer so as to reduce the amount of leakage current between conductive layer 404 and fluid region 410, for example.

A distribution of quantum dots 800 may be located so as to include an interface between lower sublayer 802 and upper sublayer 804 of the dielectric barrier layer 406 (multilayer in this example). In some implementations, quantum dots 800 may be homogeneously or inhomogeneously disposed (e.g., such as a colloidal dispersion up to about 50% volume) in a material matrix that may form a layer 806 between lower sublayer 802 and upper sublayer 804.

Figure 9:
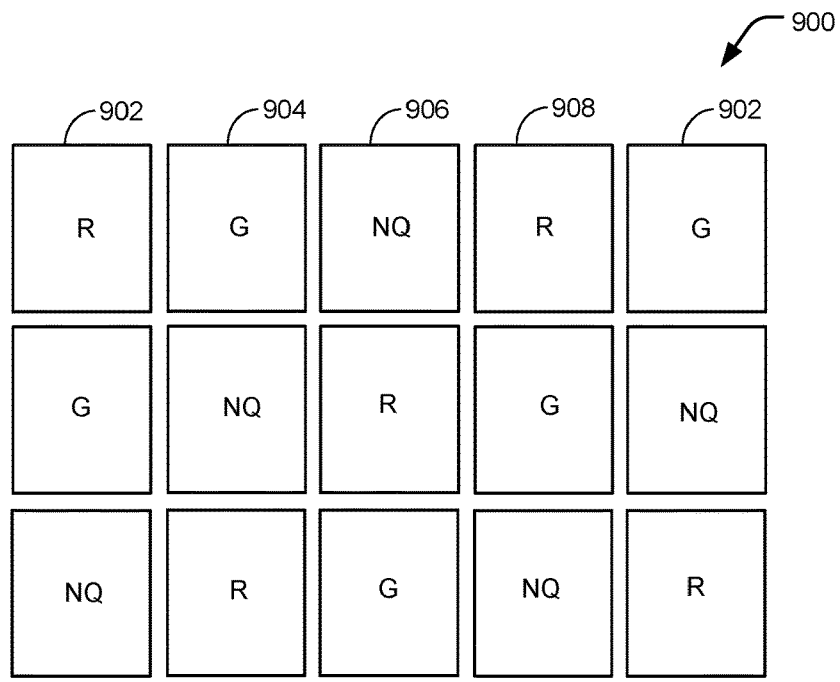
FIG. 9 is a top view of an array of electrowetting pixels in an RGB configuration, according to some embodiments.

FIG. 9 is a top view of an array 900 of electrowetting pixels for a display in a red-green-blue (RGB) color pixel configuration, according to some embodiments. Such a configuration of RGB may allow the display to produce images of any color within a color gamut set forth by the color of each of the R, G, and B pixels. Array 900 may operate by being illuminated by blue light, such as that generated by light source 148. Of course, in other implementations, array 900 may be illuminated by white light, and claimed subject matter is not limited in this respect.

Each of the pixels in array 900 may be the same as or similar to pixel 100 illustrated in FIG. 1, for example. Red color pixels 902 may include a distribution of quantum dots that emit a spectrum corresponding to a red color. Such quantum dots may be located between an electrode layer (e.g., 102) and a hydrophobic layer (e.g., 108) of the pixels 902. Thus, illuminating blue light may be utilized to produce red light by the quantum dots so as to result in a red-appearing pixel. Green color pixels 904 may include a distribution of quantum dots that emit a spectrum corresponding to a green color. Such quantum dots may be located between an electrode layer and a hydrophobic layer of the pixels 904. Thus, illuminating blue light may be utilized to produce green light by the quantum dots so as to result in a green-appearing pixel. Blue color pixels 906, indicated in FIG. 9 by "NQ" for no quantum dots, may be void of quantum dots and may be substantially transparent so as to allow illuminating blue light to transmit through the pixel. Thus, illuminating blue light need not be utilized to produce a different color and so blue color pixels 906 need not include quantum dots.

Figure 10:
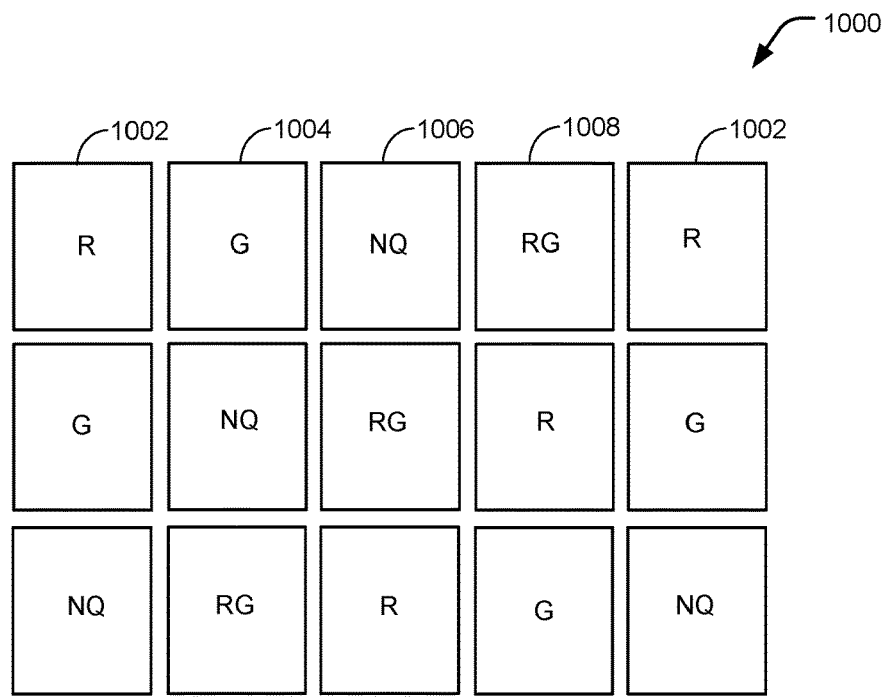
FIG. 10 is a top view of an array of electrowetting pixels in an RGBW configuration, according to some embodiments.

FIG. 10 is a top view of an array 1000 of electrowetting pixels for a display in a red-green-blue-yellow (RGBY) color pixel configuration, according to some embodiments. Such a configuration of RGBY may allow the display to produce images of any color within a color gamut set forth by the color of each of the R, G, and B pixels. In addition, yellow pixels may allow for adjustments of brightness, hue, and/or contrast ratio of images produced by the display. Array 1000 may operate by being illuminated by blue light, such as that generated by light source 148, illustrated in FIG. 1. Of course, in other implementations, array 1000 may be illuminated by white light, and claimed subject matter is not limited in this respect.

Individual pixels in array 1000 may be the same as or similar to pixel 100 illustrated in FIG. 1, for example. Red color pixels 1002 may include a distribution of quantum dots that emit a spectrum corresponding to a red color. Such quantum dots may be located between an electrode layer and a hydrophobic layer of the pixels 1002. Thus, illuminating blue light may be utilized to produce red light by the quantum dots so as to result in a red-appearing pixel. Green color pixels 1004 may include a distribution of quantum dots that emit a spectrum corresponding to a green color. Such quantum dots may be located between an electrode layer and a hydrophobic layer of the pixels 1004. Thus, illuminating blue light may be utilized to produce green light by the quantum dots so as to result in a green-appearing pixel. Blue color pixels 1006, indicated in FIG. 10 by "NQ" for no quantum dots, may be void of quantum dots and may be substantially transparent so as to allow illuminating blue light to transmit through the pixel. Thus, illuminating blue light need not be utilized to produce light of a different color and so blue color pixels 1006 need not include quantum dots.

Yellow pixels 1008, indicated in FIG. 10 by "RG" for red and green producing quantum dots, may include a first distribution of quantum dots that emit a spectrum corresponding to a red color and a second distribution of quantum dots that emit a spectrum corresponding to a green color. Such quantum dots may be located between an electrode layer and a hydrophobic layer of the pixels 1008. Thus, illuminating blue light may be utilized to produce red light and green light by the quantum dots so as to result in a yellow-appearing pixel.

Figure 11:
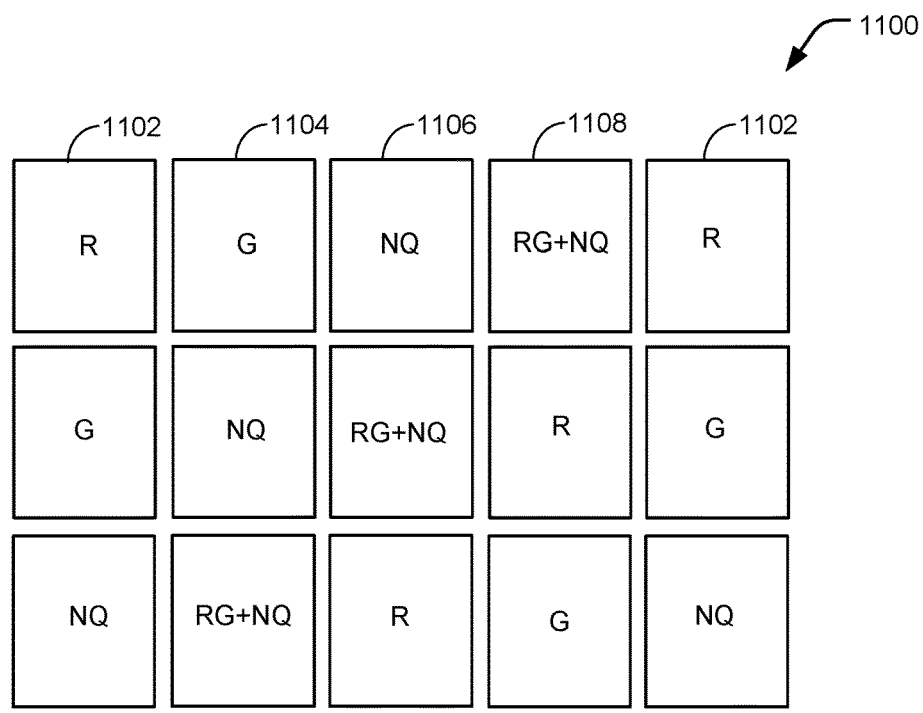
FIG. 11 is a top view of an array of electrowetting pixels in another RGBW configuration, according to some embodiments.

FIG. 11 is a top view of an array 1100 of electrowetting pixels for a display in a red-green-blue-white (RGBW) color pixel configuration, according to some embodiments. Such a configuration of RGBW may allow the display to produce images of any color within a color gamut set forth by the color of each of the R, G, and B pixels. In addition, white pixels may allow for adjustments of brightness, hue, and/or contrast ratio of images produced by the display. Array 1100 may operate by being illuminated by blue light, such as that generated by light source 148, illustrated in FIG. 1. Of course, in other implementations, array 1100 may be illuminated by white light, and claimed subject matter is not limited in this respect.

Each of the pixels in array 1100 may be the same as or similar to pixel 100 illustrated in FIG. 1, for example. Red color pixels 1102 may include a distribution of quantum dots that emit a spectrum corresponding to a red color. Such quantum dots may be located between an electrode layer and a hydrophobic layer of the pixels 1102. Thus, illuminating blue light may be utilized to produce red light by the quantum dots so as to result in a red-appearing pixel. Green color pixels 1104 may include a distribution of quantum dots that emit a spectrum corresponding to a green color. Such quantum dots may be located between an electrode layer and a hydrophobic layer of the pixels 1104. Thus, illuminating blue light may be utilized to produce green light by the quantum dots so as to result in a green-appearing pixel. Blue color pixels 1106, indicated in FIG. 11 by "NQ" for no quantum dots, may be void of quantum dots and may be substantially transparent so as to allow illuminating blue light to transmit through the pixel. Thus, illuminating blue light need not be utilized to produce light of a different color and so blue color pixels 1106 need not include quantum dots.

White pixels 1108, indicated in FIG. 11 by "RG+NQ" for red and green producing quantum dots and areas void of quantum dots, may include a first distribution of quantum dots that emit a spectrum corresponding to a red color and a second distribution of quantum dots that emit a spectrum corresponding to a green color. Such quantum dots may be located between an electrode layer and a hydrophobic layer of the pixels 1108. Additionally, white pixels 1108 may include areas that are void of quantum dots, as described below. Such areas void of quantum dots may be substantially transparent so as to allow illuminating blue light to transmit through the pixel. Thus, illuminating blue light is not utilized to produce other colors and so these areas contribute a blue color to the pixels 1108. Accordingly, quantum dots produce red light and green light that is mixed with blue light so as to result in a white-appearing pixel.

Figure 12:
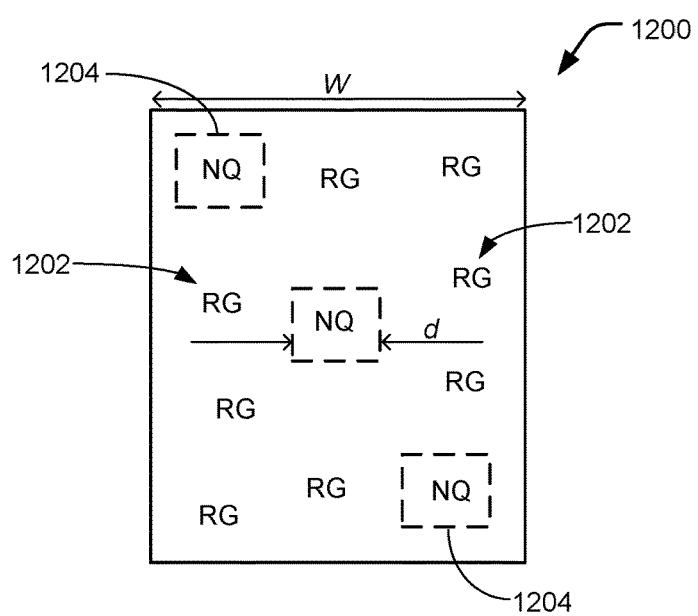
FIG. 12 is a top view of a white electrowetting pixel, according to some embodiments.

FIG. 12 is a top view of a white electrowetting pixel 1200, according to some embodiments. For example, white pixel 1200 may be the same as or similar to pixels 1108 illustrated in FIG. 11. White pixel 1200 may include RG regions 1202 comprising a mixture of quantum dots having fluorescence spectra corresponding to red and green colors. Such quantum dots may be located between an electrode layer (e.g., 102) and a hydrophobic layer (e.g., 108) of the pixel 1200. Additionally, white pixel 1200 may include areas 1204 that are void of quantum dots. In other words, substantially the entire area of pixel 1200 may include (red and green) quantum dots RG except for one or more areas 1204 that are void of quantum dots. Such quantum dots-free areas 1204 may be substantially transparent so as to allow illuminating blue light to transmit through the pixel. Thus, illuminating blue light is not utilized to produce other colors and so areas 1204 contribute a blue color to the pixel 1200. Accordingly, quantum dots in RG regions 1202 produce red light and green light that is mixed with blue light of areas 1204 so as to result in a white-appearing pixel. In some implementations, areas 1204 may have any of a number of shapes, such as rectangular, square, elliptical, circular, and so. At least one dimension d may be greater than about 10% or 20% of the width W of pixel 1200, for example.

Figure 13:
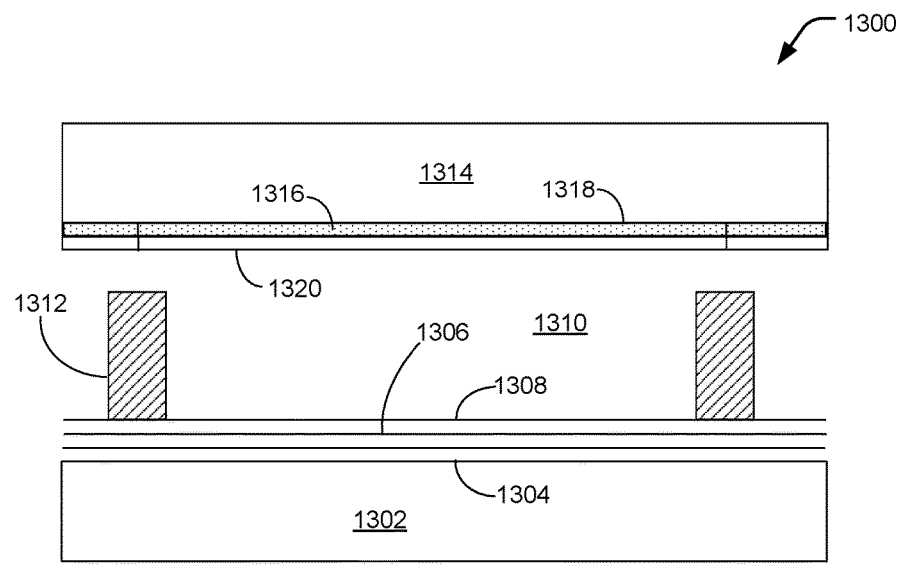
FIGS. 13-15 illustrate cross-section views of an electrowetting pixel, according to some embodiments.

FIG. 13 is a cross-section view of an electrowetting pixel 1300, according to some embodiments. Such a cross-section view is similar to that of FIG. 4, for example, but includes a top support plate, which is not illustrated in FIG. 4 for sake of clarity.

Pixel 1300 may be located on a support plate 1302 and may include, among other things, a conductive layer 1304, a dielectric barrier layer 1306, and a hydrophobic layer 1308 at least partially covering the dielectric barrier layer, similar to those described above for FIG. 4. A fluid region 1310, which may comprise one or more different fluids that are immiscible with one another, may cover the stack of conductive layer 1304, dielectric barrier layer 1306, and hydrophobic layer 1308. Pixel walls 1312 may surround a periphery of fluid region 1310. A top support plate 1314 may overlay fluid region 1310.

In some embodiments, a distribution of quantum dots 1316 may be located on top support plate 1314. Such a distribution may be present as a homogeneous or non-homogenous concentration of quantum dots in a dedicated matrix material layer 1318. Quantum dots 1316 may have different sizes, and thus emit different colored light, for different pixels, for example. A color filter 1320 may be disposed on layer 1318. In such embodiments, quantum dots 1316 may emit colored light, a portion of which may be received by color filter 1320. Subsequently, the color filter may produce (post-transmission through the color filter) light having a color (e.g., spectrum) different from that of the colored light emitted by the quantum dots.

Figure 14:
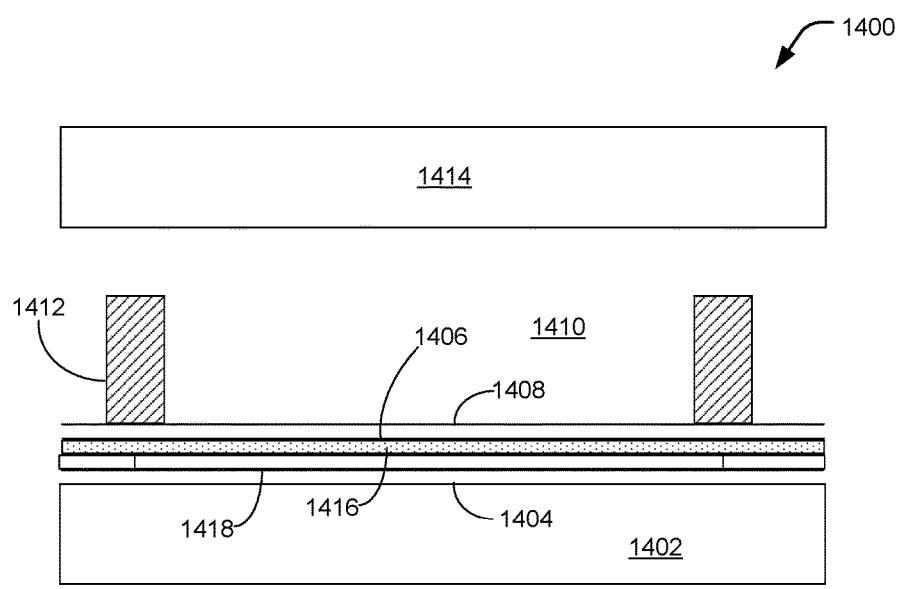

FIG. 14 is a cross-section view of an electrowetting pixel 1400, according to some embodiments. Such a cross-section view is similar to that of FIG. 4, for example, but includes a top support plate, which is not illustrated in FIG. 4 for sake of clarity.

Pixel 1400 may be located on a support plate 1402 and may include, among other things, a conductive layer 1404, a dielectric barrier layer 1406, and a hydrophobic layer 1408 at least partially covering the dielectric barrier layer, similar to those described above for FIG. 4. A fluid region 1410, which may comprise one or more different fluids that are immiscible with one another, may cover the stack of conductive layer 1404, dielectric barrier layer 1406, and hydrophobic layer 1408. Pixel walls 1412 may surround a periphery of fluid region 1410. A top support plate 1414 may overlay fluid region 1410.

In some embodiments, a distribution of quantum dots 1416 may be located (e.g., as a homogeneous or non-homogeneous concentration) in dielectric barrier layer 1406, hydrophobic layer 1408, both dielectric barrier layer 1406 and hydrophobic layer 1408, or between dielectric barrier layer 1406 and hydrophobic layer 1408 as a distribution of quantum dots in a dedicated matrix material layer, for example. Quantum dots 1416 may have different sizes, and thus emit different colored light, for different pixels, for example. A color filter 1418 may be disposed above or below dielectric barrier layer 1406.

Figure 15:
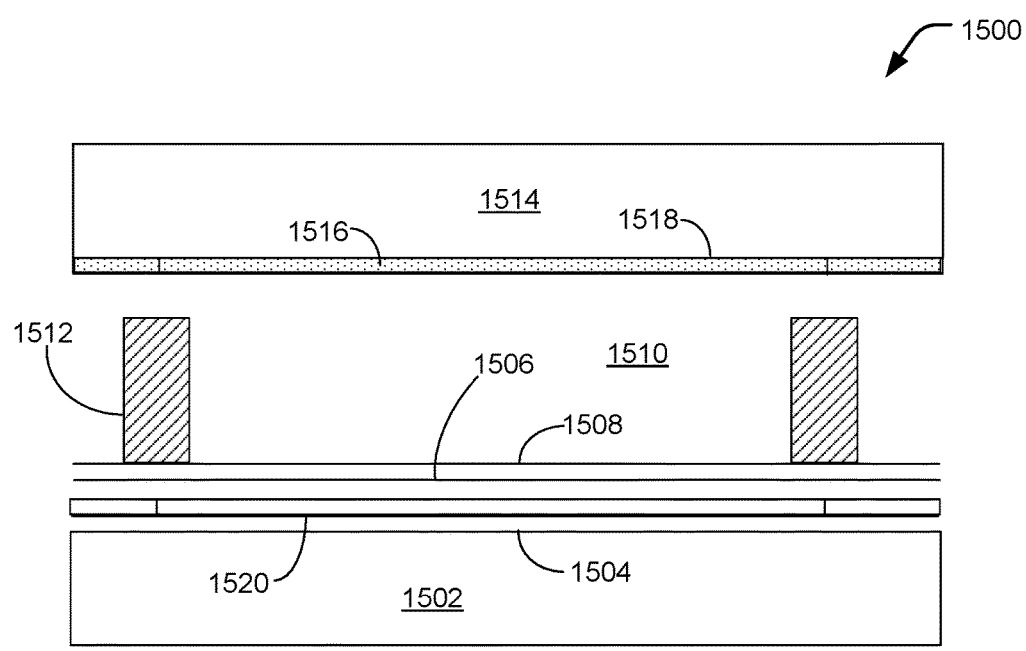

FIG. 15 is a cross-section view of an electrowetting pixel 1500, according to some embodiments. Such a cross-section view is similar to that of FIG. 4, for example, but includes a top support plate, which is not illustrated in FIG. 4 for sake of clarity.

Pixel 1500 may be located on a support plate 1502 and may include, among other things, a conductive layer 1504, a dielectric barrier layer 1506, and a hydrophobic layer 1508 at least partially covering the dielectric barrier layer, similar to those described above for FIG. 4. A fluid region 1510, which may comprise one or more different fluids that are immiscible with one another, may cover the stack of conductive layer 1504, dielectric barrier layer 1506, and hydrophobic layer 1508. Pixel walls 1512 may surround a periphery of fluid region 1510. A top support plate 1514 may overlay fluid region 1510.

In some embodiments, a distribution of quantum dots 1516 may be located on top support plate 1514. Such a distribution may be present as a homogeneous or non-homogenous concentration of quantum dots in a dedicated matrix material layer 1518. Quantum dots 1516 may have different sizes, and thus emit different colored light, for different pixels, for example. A color filter 1520 may be disposed above or below dielectric barrier layer 1506, for example.

Figure 16:
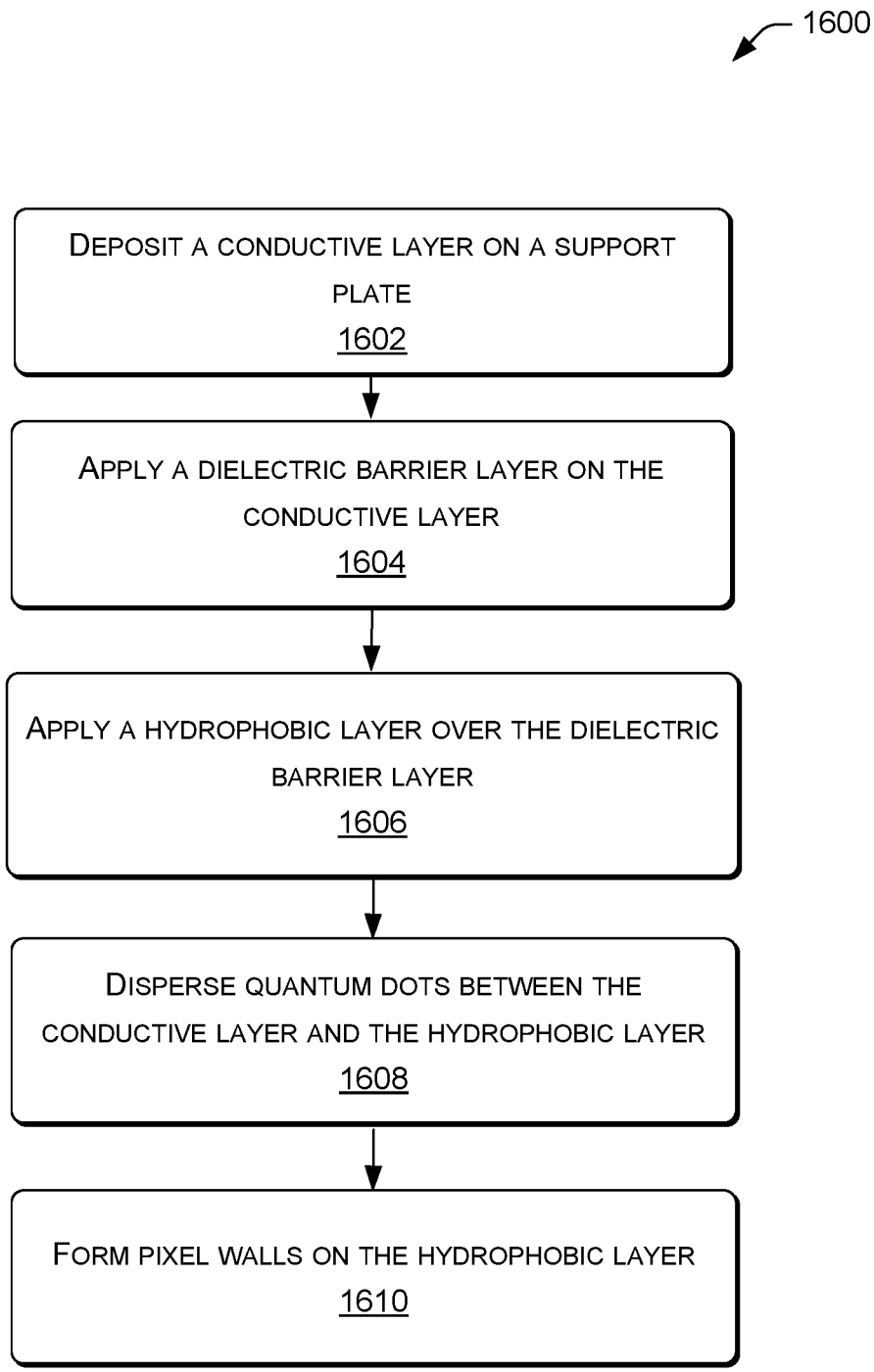
FIG. 16 is a flow diagram of a process for fabricating an electrowetting display device, according to various example embodiments.

FIG. 16 is a flow diagram of a process 1600 for fabricating an electrowetting display device, according to various embodiments. For example, the display device may be the same as or similar to the display device illustrated in FIG. 1. Though claimed subject matter is not limited in this respect, process 1600 may be performed manually (e.g., by humans) and/or automatic equipment. At block 1602, a conductive layer is deposited on a support plate. For example, the conductive layer may be the same as or similar to 102 illustrated in FIG. 1. For reflective electrowetting displays, the conductive layer may be a reflective metal such as tin, copper, gold, or an alloy of such metals, for example. For transmissive electrowetting displays, the conductive layer may be transparent and may comprise indium tin oxide (ITO), indium titanium oxide, or a conductive organic material, for example. Such a conductive layer may have a thickness of about 30 nanometers or less, for example. Deposition techniques include, for example, chemical vapor deposition (CVD), physical vapor deposition (PVD), molecular beam epitaxy (MBE), sputtering, and so on. A support plate may be the same as or similar to support plate 104 illustrated in FIG. 1, for example.

At block 1604, a dielectric barrier layer (e.g., 406, illustrated in FIG. 4) is applied on the conductive layer. The dielectric layer may comprise SiN, SiON, SiO, or TaO, just to name a few examples. Additionally, in some embodiments, the dielectric layer may comprise a multilayer structure that includes organic and inorganic sublayers. Any of a number of deposition techniques may be used, such as CVD, PVD, MBE, and sputtering, for example. At block 1606, a hydrophobic layer (e.g., hydrophobic layer 408, illustrated in FIG. 4) may be applied over the dielectric layer. At block 1608, quantum dots may be dispersed between the conductive layer and the hydrophobic layer by any of a number of techniques. For example, quantum dots may be dispersed by a mixing process, a process of exposing the carrier material (e.g., matrix layer, hydrophobic layer, dielectric layer, and so on) to a concentration of the quantum dots, or an implantating process, just to name a few examples. In a number of implementations, placement of the quantum dots may occur before or after deposition of the hydrophobic layer or the dielectric barrier layer.

At block 1610, pixel walls may be formed on the hydrophobic layer. In some implementations, the pixel walls may be formed by depositing a photoresist material on the hydrophobic layer and subsequently etching the photoresist material with a pattern configured to form the pixel walls. The photoresist material may comprise, for example, epoxy-based negative photoresist SU-8.

Figure 17:
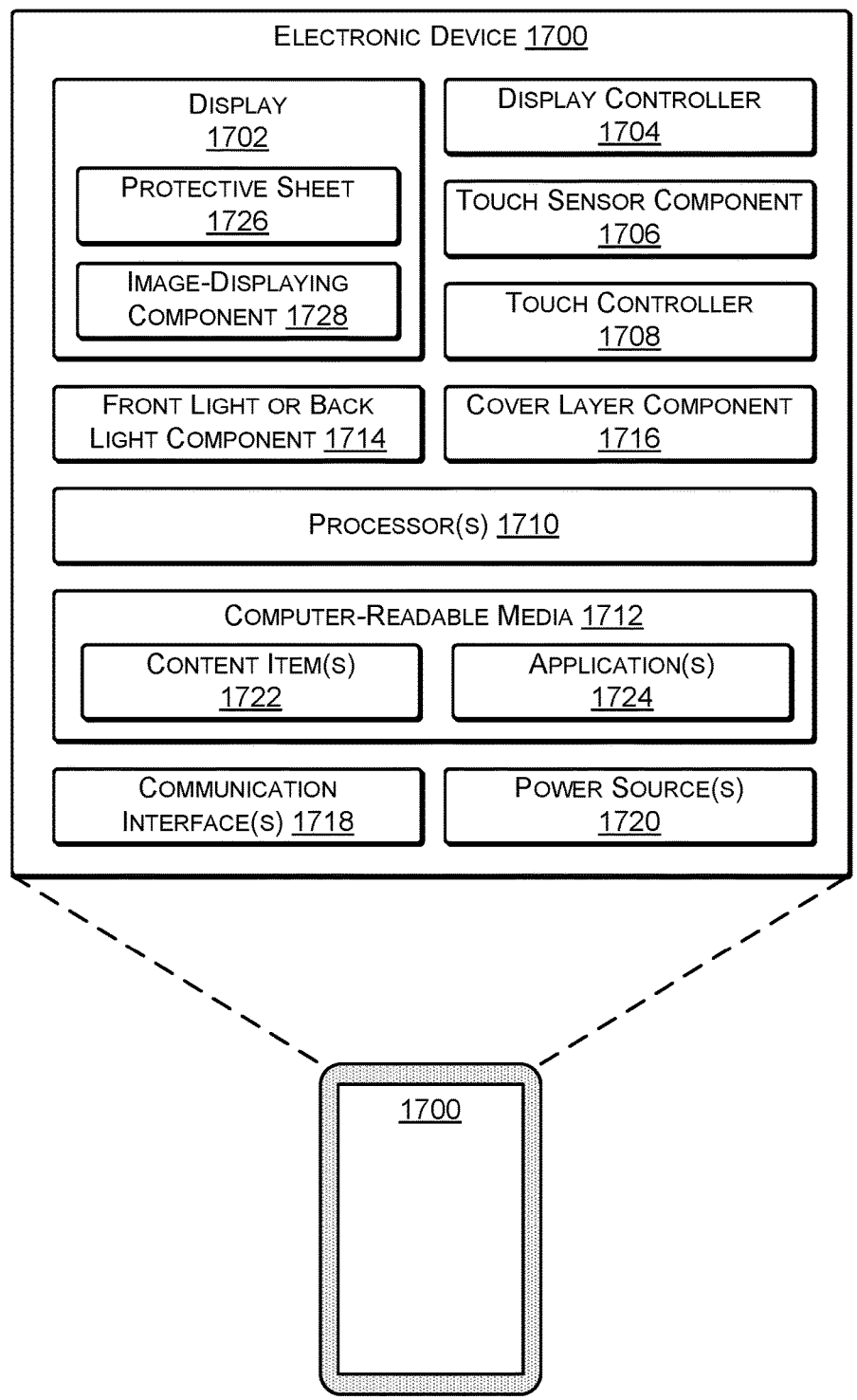
FIG. 17 illustrates an example electronic device that may incorporate a display device, according to some embodiments.

FIG. 17 illustrates an example electronic device 1700 that may incorporate any of the display devices discussed above. The device 1700 may comprise any type of electronic device having a display. For instance, the device 1700 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 1700 may be a non-mobile electronic device (e.g., a computer display, a television, etc.). In addition, while FIG. 17 illustrates several example components of the electronic device 1700, it is to be appreciated that the device 1700 may also include other conventional components, such as an operating system, system busses, input/output components, and the like. Further, in other examples, such as in the case of a television or computer monitor, the electronic device 1700 may only include a subset of the components illustrated.

Regardless of the specific implementation of the electronic device 1700, the device 1700 includes a display 1702 and a corresponding display controller 1704. The display 1702 may represent a reflective or transmissive display in some instances.

In an implementation, the display comprises an electrowetting display that employs an applied voltage to change the surface tension of a fluid in relation to a surface. For example, such an electrowetting display may include the array of pixels 170 illustrated in FIG. 1, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by contracting a colored oil film if a voltage is applied to individual pixels of the display. If the voltage is absent, the colored oil forms a continuous film within a pixel, and the color may thus be visible to a user of the display. On the other hand, if the voltage is applied to the pixel, the colored oil is displaced and the pixel becomes transparent. If multiple pixels of the display are independently activated, the display may present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content.

Of course, while several different examples have been given, it is to be appreciated that while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the display 1702 may represent a backlit display, examples of which are mentioned above.

In addition to including the display 1702, FIG. 17 illustrates that some examples of the device 1700 may include a touch sensor component 1706 and a touch controller 1708. In some instances, at least one touch sensor component 1706 resides with, or is stacked on, the display 1702 to form a touch-sensitive display. Thus, the display 1702 may be capable of both accepting user touch input and rendering content in response to or corresponding to the touch input. As several examples, the touch sensor component 1706 may comprise a capacitive touch sensor, a force sensitive resistance (FSR), an interpolating force sensitive resistance (IFSR) sensor, or any other type of touch sensor. In some instances, the touch sensor component 1706 is capable of detecting touches as well as determining an amount of pressure or force of these touches.

FIG. 17 further illustrates that the electronic device 1700 may include one or more processors 1710 and one or more computer-readable media 1712, as well as a front light component 1714 (which may alternatively be a backlight component in the case of a backlit display) for lighting the display 1702, a cover layer component 1716, such as a cover glass or cover sheet, one or more communication interfaces 1718 and one or more power sources 1720. The communication interfaces 1718 may support both wired and wireless connection to various networks, such as cellular networks, radio, WiFi networks, short range networks (e.g., Bluetooth®), infrared (IR), and so forth.

Depending on the configuration of the electronic device 1700, the computer-readable media 1712 (and other computer-readable media described throughout) is an example of computer storage media and may include volatile and nonvolatile memory. Thus, the computer-readable media 1712 may include, but is not limited to, RAM, ROM, EEPROM, flash memory, or other memory technology, or any other medium that may be used to store computer-readable instructions, programs, applications, media items, and/or data which may be accessed by the electronic device 1700.

The computer-readable media 1712 may be used to store any number of functional components that are executable on the processor 1710, as well as content items 1722 and applications 1724. Thus, the computer-readable media 1712 may include an operating system and a storage database to store one or more content items 1722, such as eBooks, audio books, songs, videos, still images, and the like. The computer-readable media 1712 of the electronic device 1700 may also store one or more content presentation applications to render content items on the device 1700. These content presentation applications may be implemented as various applications 1724 depending upon the content items 1722. For instance, the content presentation application may be an electronic book reader application for rending textual electronic books, an audio player for playing audio books or songs, a video player for playing video, and so forth.

In some instances, the electronic device 1700 may couple to a cover (not illustrated in FIG. 17) to protect the display (and other components in the display stack or display assembly) of the device 1700. In one example, the cover may include a back flap that covers a back portion of the device 1700 and a front flap that covers the display 1702 and the other components in the stack. The device 1700 and/or the cover may include a sensor (e.g., a Hall effect sensor) to detect if the cover is open (i.e., if the front flap is not atop the display and other components). The sensor may send a signal to the front light component 1714 if the cover is open and, in response, the front light component 1714 may illuminate the display 1702. If the cover is closed, meanwhile, the front light component 1714 may receive a signal indicating that the cover has closed and, in response, the front light component 1714 may turn off.

Furthermore, the amount of light emitted by the front light component 1714 may vary. For instance, upon a user opening the cover, the light from the front light may gradually increase to its full illumination. In some instances, the device 1700 includes an ambient light sensor (not illustrated in FIG. 17) and the amount of illumination of the front light component 1714 may be based at least in part on the amount of ambient light detected by the ambient light sensor. For example, the front light component 1714 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 1702 may vary depending on whether the front light component 1714 is on or off, or based on the amount of light provided by the front light component 1714. For instance, the electronic device 1700 may implement a larger default font or a greater contrast if the light is off compared to if the light is on. In some instances, the electronic device 1700 maintains, if the light is on, a contrast ratio for the display that is within a certain defined percentage of the contrast ratio if the light is off.

As described above, the touch sensor component 1706 may comprise a capacitive touch sensor that resides atop the display 1702. In some examples, the touch sensor component 1706 may be formed on or integrated with the cover layer component 1716. In other examples, the touch sensor component 1706 may be a separate component in the stack of the display assembly. The front light component 1714 may reside atop or below the touch sensor component 1706. In some instances, either the touch sensor component 1706 or the front light component 1714 is coupled to a top surface of a protective sheet 1726 of the display 1702. As one example, the front light component 1714 may include a lightguide sheet and a light source (not illustrated in FIG. 17). The lightguide sheet may comprise a substrate (e.g., a transparent thermoplastic such as PMMA or other acrylic), a layer of lacquer and multiple grating elements formed in the layer of lacquer that function to propagate light from the light source towards the display 1702, thus illuminating the display 1702.

The cover layer component 1716 may include a transparent substrate or sheet having an outer layer that functions to reduce at least one of glare or reflection of ambient light incident on the electronic device 1700. In some instances, the cover layer component 1716 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a $3h$ pencil). Without such scratch resistance, a device may be more easily scratched and a user may perceive the scratches from the light that is dispersed over the top of the reflective display. In some examples, the protective sheet 1726 may include a similar UV-cured hard coating on the outer surface. The cover layer component 1716 may couple to another component or to the protective sheet 1726 of the display 1702. The cover layer component 1716 may, in some instances, also include a UV filter, a UV-absorbing dye, or the like, for protecting components lower in the stack from UV light incident on the electronic device 1700. In still other examples, the cover layer component 1716 may include a sheet of high-strength glass having an antiglare and/or antireflective coating.

The display 1702 includes the protective sheet 1726 overlying an image-displaying component 1728. For example, the display 1702 may be preassembled to have the protective sheet 1726 as an outer surface on the upper or image-viewing side of the display 1702. Accordingly, the protective sheet 1726 may be integral with and may overlay the image-displaying component 1728. The protective sheet 1726 may be optically transparent to enable a user to view, through the protective sheet 1726, an image presented on the image-displaying component 1728 of the display 1702.

In some examples, the protective sheet 1726 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 1726 may include a coating, such as the hard coating described above. For instance, the hard coating may be applied to the outer surface of the protective sheet 1726 before or after assembly of the protective sheet 1726 with the image-displaying component 1728 of the display 1702. In some examples, the hard coating may include a photoinitiator or other reactive species in its composition, such as for curing the hard coating on the protective sheet 1726. Furthermore, in some examples, the protective sheet 1726 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 1726, thereby protecting the image-displaying component 1728 from UV light.

According to some implementations herein, one or more of the components discussed above may be coupled to the display 1702 using fluid optically-clear adhesive (LOCA). For example, suppose that the light guide portion of the front light component 1714 is to be coupled to the display 1702. The light guide may be coupled to the display 1702 by placing the LOCA on the outer or upper surface of the protective sheet 1726. If the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 1714 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 1714. In other implementations, the LOCA may be placed near a center of the protective sheet 1726, and pressed outwards towards a perimeter of the top surface of the protective sheet 1726 by placing the front light component 1714 on top of the LOCA. The LOCA may then be cured by directing UV light through the front light component 1714. As discussed above, and as discussed additionally below, various techniques, such as surface treatment of the protective sheet, may be used to prevent discoloration of the LOCA and/or the protective sheet 1726.

While FIG. 17 illustrates a few example components, the electronic device 1700 may have additional features or functionality. For example, the device 1700 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within the device 1700 may reside remotely from the device 1700 in some implementations. In these implementations, the device 1700 may utilize the communication interfaces 1718 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

It will be understood that when an element or layer is referred to as being "on", "over", or "connected to" another element or layer, it can be directly on, connected or coupled to the other element or layer or intervening elements or layers may be present. In contrast, when an element is referred to as being "directly on" or "directly connected to" another element or layer, there are no intervening elements or layers present.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. An electrowetting display device comprising:
 a first support plate comprising rows and columns of electrowetting subpixel regions;
 a second support plate;
 an electrode layer on a portion of the first support plate;
 a dielectric barrier layer on the electrode layer;
 a hydrophobic layer on the dielectric barrier layer;
 wherein a first electrowetting subpixel region of the electrowetting subpixel regions comprises a first solid material matrix comprising a first distribution of quantum dots, wherein the first distribution of quantum dots is configured to emit red light and is between the hydrophobic layer and the electrode layer, and
 wherein a second electrowetting subpixel region of the electrowetting subpixel regions comprises a second solid material matrix comprising a second distribution of quantum dots, wherein the second distribution of quantum dots is configured to emit green light and is between the hydrophobic layer and the electrode layer;
 a first fluid on at least a portion of the hydrophobic layer; and
 a second fluid immiscible with the first fluid, wherein the first fluid and the second fluid are between the first support plate and the second support plate.

2. The electrowetting display device of claim 1, further comprising a blue light source configured to illuminate the first electrowetting pixel region and the second electrowetting pixel region.

3. The electrowetting display device of claim 1, wherein the dielectric barrier layer comprises the first solid material matrix comprising the first distribution of quantum dots and the second solid material matrix comprising the second distribution of quantum dots.

4. The electrowetting display device of claim 1, wherein the dielectric barrier layer comprises a multilayer structure comprising an inorganic layer and an organic layer, and wherein the first solid material matrix comprising the first distribution of quantum dots and the second solid material matrix comprising the second distribution of quantum dots are each located between the organic layer and the inorganic layer.

5. An electrowetting display device comprising:
 a first support plate;
 a second support plate;
 a fluid region between the first support plate and the second support plate; and
 an electrowetting pixel comprising:
  an electrode layer on the first support plate;
  a dielectric barrier layer on the electrode layer;
  a hydrophobic layer on the dielectric barrier layer; and
  a solid material matrix comprising quantum dots, wherein the solid material matrix comprising the quantum dots is between the hydrophobic layer and the electrode layer.

6. The electrowetting display device of claim 5, further comprising a blue light source configured to illuminate the electrowetting pixel.

7. The electrowetting display device of claim 5, wherein the solid material matrix comprising the quantum dots is within the dielectric barrier layer.

8. The electrowetting display device of claim 5, wherein the dielectric barrier layer comprises a multilayer structure, and wherein the solid material matrix comprising the quantum dots is within one layer of the multilayer structure of the dielectric barrier layer.

9. The electrowetting display device of claim 5, wherein the quantum dots of the solid material matrix are distributed homogeneously within the dielectric barrier layer.

10. The electrowetting display device of claim 5, wherein the quantum dots of the solid material matrix are distributed homogeneously within the solid material matrix.

11. The electrowetting display device of claim 5, wherein the electrowetting pixel is a first electrowetting pixel; the quantum dots of the solid material matrix are first quantum dots configured to emit a first color; the solid material matrix is a first solid material matrix; and the electrowetting display device further comprises:

a pixel wall that partitions the first electrowetting pixel from a second electrowetting pixel, the second electrowetting pixel comprising a second solid material matrix comprising second quantum dots configured to emit a second color, different from the first color.

12. The electrowetting display device of claim 11, further comprising a third electrowetting pixel that is void of quantum dots; and a blue light source configured to illuminate the first electrowetting pixel, the second electrowetting pixel, and the third electrowetting pixel.

13. The electrowetting display device of claim 11, further comprising a third electrowetting pixel that comprises the first quantum dots and the second quantum dots.

14. The electrowetting display device of claim 11, further comprising a third electrowetting pixel that comprises the first quantum dots, the second quantum dots, and a region that is void of the first quantum dots and the second quantum dots, wherein the region has at least one dimension that is larger than about 10% of at least one of a first width of the first electrowetting pixel or a second width of the second electrowetting pixel.

15. The electrowetting display device of claim 5, wherein the electrode layer is reflective.

16. The electrowetting display device of claim 5, further comprising a color filter at least partially covering the fluid region.

17. An electrowetting display device comprising:
a support plate;
pixel walls partitioning individual electrowetting pixels on the support plate;
an electrode layer on the support plate and between the pixel walls;
a hydrophobic layer on and at least partially covering the electrode layer; and
quantum dots in a solid material matrix and between the electrode layer and the hydrophobic layer.

18. The electrowetting display device of claim 17, wherein the support plate is a first support plate, and the electrowetting display further comprises:
a second support plate;
a fluid region between the first support plate and the second support plate; and
a color filter at least partially covering the fluid region.

19. The electrowetting display device of claim 17, wherein the quantum dots are distributed substantially homogeneously in the solid material matrix.

* * * * *